(No Model.)
C. W. SMITH.
THILL COUPLING.
No. 514,510. Patented Feb. 13, 1894.
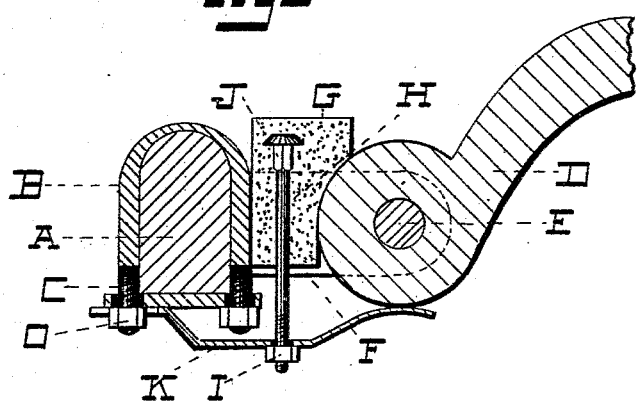
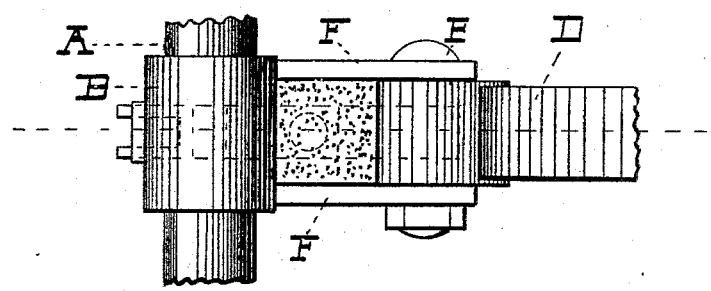
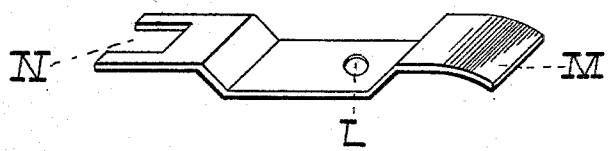
Witnesses
H. C. Monroe
R. H. House
Charles W. Smith, Inventor
By his Attorney Warren D. House.

UNITED STATES PATENT OFFICE.

CHARLES W. SMITH, OF KANSAS CITY, MISSOURI.

THILL-COUPLING.

SPECIFICATION forming part of Letters Patent No. 514,510, dated February 13, 1894.

Application filed June 1, 1893. Serial No. 476,279. (No model.)

*To all whom it may concern:*

Be it known that I, CHARLES W. SMITH, a citizen of the United States, residing at Kansas City, in the county of Jackson and State of Missouri, have invented certain new and useful Improvements in Thill-Couplings, of which the following is a specification, reference being had theirein to the accompanying drawings.

My invention relates to improvements in anti-rattlers for thill couplings.

The object of my invention is to provide a mechanism connected with a thill coupling which shall prevent the rattling of the parts due to wear.

My invention consists in a soft cushion of rubber or other resilient material that is capable of being molded, located between the thill iron and the clip with which it is connected and held within such position by means of a bolt the head of which is embedded within the substance of the cushion, said bolt being connected with a spring strip one end of which has a bearing upon the lower side of the thill iron, the other end straddling one of the threaded ends of the clip. A portion at least, of the part of the bolt that is embedded in the rubber cushion, has a cross section otherwise than round so that it may not be revolved within the rubber while the parts are being mounted.

The object of embedding the bolt head within the rubber cushion is to prevent the action of the elements upon the bolt and thus producing rust, the tendency of which, in connection with the strain of the bolt, is to disintegrate the material of which the cushion is formed.

In the accompanying drawings illustrative of my invention, Figure I represents a vertical sectional view. Fig. II represents a plan view showing a portion of the axle and the thill iron. Fig. III represents in perspective the spring strip.

Similar letters of reference indicate similar parts.

A, indicates the axle of the wagon or carriage, B, indicates the clip mounted thereon and C, indicates the threaded ends of the clip.

D, indicates the thill iron provided with an opening through which passes the pin E, mounted in openings at the outer ends of the clip lugs F. A rectangular piece of soft rubber G, is located between the clip B, and the thill iron D, a portion of the rubber next to the thill iron being so shaped as to fit against the surface of said thill iron. Embedded within the block of rubber G, is a bolt H, the lower end of which projects vertically outside the rubber block and is screw-threaded and provided with a nut I. The bolt which I prefer to use is a common carriage bolt having the portion immediately below the head square in cross section, as indicated by J, Fig. I. It is desirable that a portion of the bolt which is embedded within the rubber, shall have a cross section otherwise than round to prevent its turning within the rubber. Any shape convenient for manufacture may be used, such as square or hexagonal. The rubber cushion is held in position by means of a spring strip K, which is provided with an opening L, through which the bolt H, passes.

One end of the spring strip K, is provided with a curved portion M, adapted to bear against the lower side of the thill iron D. The other end of the said strip is provided with a slot N, which is adapted to a nut O, on the threaded end C, of the thill coupling.

My invention is used as follows:—The bolt H, is molded as hereinbefore described, within the rubber cushion G, which is placed in the position indicated in Fig. 1, between the lugs F, of the clip and the thill iron D. The spring strip K, is now placed on the bolt H, the slotted end being placed so that the nut O, is within the slot N, and the curved end M, of the strip is against the lower side of the thill iron D. The nut I, is now screwed on the bolt H, and up against the bottom of the spring strip K, thus securing the parts in their respective positions. The upper portion of the cushion G, serves to protect the bolt H from the action of the elements, the whole of the working parts being thus shielded from the weather and largely increasing their period of usefulness.

Having thus described my invention, what I claim, and desire to secure by Letters Patent, is—

1. In an anti-rattling device for thill couplings, the combination with a cushion of rubber or analogous substance located between the clip and the thill iron, of a bolt having its upper portion embedded in the cushion, and a spring locking mechanism connected with the bolt, substantially as described.

2. In an anti-rattling device for thill couplings, the combination with a soft rubber cushion inserted between the clip and the thill iron, of a bolt the upper portion of which is embedded within said rubber cushion, a cross section of a portion at least of said embedded part of the bolt being otherwise than round, and a spring strip connected with said bolt and having a bearing against the clip at one end and the thill iron at the other, substantially as described.

3. In an anti-rattling device for thill couplings, the combination with the cushion G, of the bolt H, embedded therein, and provided with the square portion J, and screw-threaded end having a nut I, mounted thereon, a spring strip K, provided with a slot N, engaging the nut O, and a curved end M, bearing against the thill iron D, substantially as described.

In testimony whereof I affix my signature in presence of two witnesses.

CHARLES W. SMITH.

Witnesses:
FRANK. C. WARD,
WILL SMITH.